US010416737B2

(12) United States Patent
Chandra (10) Patent No.: US 10,416,737 B2
(45) Date of Patent: Sep. 17, 2019

(54) THERMAL MITIGATION BASED ON PREDICTED TEMPERATURES

(71) Applicant: QUALCOMM Incorporated, San Diego, CA (US)

(72) Inventor: Rajit Chandra, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 559 days.

(21) Appl. No.: 14/532,980

(22) Filed: Nov. 4, 2014

(65) Prior Publication Data

US 2016/0124475 A1 May 5, 2016

(51) Int. Cl.
*G06F 11/30* (2006.01)
*G06F 1/20* (2006.01)
*G05B 13/04* (2006.01)
*G06F 1/3234* (2019.01)

(52) U.S. Cl.
CPC ........... *G06F 1/206* (2013.01); *G05B 13/048* (2013.01); *G06F 1/3234* (2013.01)

(58) Field of Classification Search
CPC ....................................... G06F 1/206
See application file for complete search history.

(56) References Cited

U.S. PATENT DOCUMENTS 7,464,278 B2  12/2008 Cohen et al.
7,484,111 B2  1/2009 Fung
7,784,050 B2  8/2010 Harris
2010/0030395 A1*  2/2010 Shimotono ............. G06F 1/206
                                             700/300

(Continued)

FOREIGN PATENT DOCUMENTS

CN  101639723 A  2/2010
EP    0712064 A1  5/1996
EP    0712064 B1  8/2000

(Continued)

OTHER PUBLICATIONS

International Search Report and Written Opinion—PCT/US2015/053593—ISA/EPO—dated Dec. 11, 2015.

(Continued)

*Primary Examiner* — Phuong Huynh
(74) *Attorney, Agent, or Firm* — Arent Fox, LLP (57) ABSTRACT

An apparatus is presented. The apparatus includes a first circuit configured to predict temperatures of a location for a plurality of time instances based on measured temperatures and a second circuit configured to schedule a thermal mitigation function based on the predicted temperatures. A method of operating an apparatus is presented. The method includes measuring temperatures on an integrated circuit, predicting temperatures of a location for a plurality of time instances based on the measured temperatures, and scheduling a thermal mitigation function based on the predicted temperatures. An apparatus is presented. The apparatus includes means for measuring temperatures on an integrated circuit, means for predicting temperatures of a location for a plurality of time instances based on measured temperatures, and means for scheduling a thermal mitigation function based on the predicted temperatures.

30 Claims, 4 Drawing Sheets

(56) References Cited

U.S. PATENT DOCUMENTS

2012/0209559 A1    8/2012  Brower
2014/0277815 A1    9/2014  Hanumaiah et al.

FOREIGN PATENT DOCUMENTS

EP    2560073      *  2/2013
EP    2560073 A1      2/2013

OTHER PUBLICATIONS

Sharifi S., et al., "Accurate Temperature Estimation for Efficient Thermal Management," Quality Electronic Design, 2008. ISQED 2008. 9th International Symposium on IEEE, Piscataway, NJ, USA, Mar. 17, 2008 (Mar. 17, 2008), pp. 137-142, XP031239506, ISBN: 978-0-7695-3117-5.
Khan O., "A Hardware/Software Co-Design Architecture for Thermal, Power, and Reliability Management in Chip Multiprocessors," Feb. 2010, pp. 1-144.

* cited by examiner

THERMAL MITIGATION BASED ON PREDICTED TEMPERATURES

BACKGROUND

1. Field

The disclosure relates to apparatuses with thermal management functions and, in particular, to electronic apparatuses and integrated circuits (ICs) scheduling the thermal mitigation functions based on predicted temperatures.

2. Background

Increasingly, thermal management is becoming an issue in operating ICs. For example, wireless communication technologies and devices (e.g., cellular phones, tablets, laptops, etc.) have grown in popularity and uses over the past several years. These electronic apparatuses have grown in complexity and now commonly include multiple processors (e.g., baseband processor and application processor) and other resources that allow the users to execute complex and power intensive software applications (e.g., music players, web browsers, video streaming applications, etc.). To meet the increasing performance demand, the processors has increased in complexity and operate in frequencies in the gigahertz range. As a result, substantial heat may be produced while operating these processors.

The heat generated by the processors may affect performance and reliability of the device. For example, both performance and reliability of an IC may degrade when operating in high temperature. Thus, a design challenge is to provide the thermal mitigation functions to manage the heat issue.

SUMMARY

Aspects of a method of operating an apparatus are disclosed. The method includes measuring temperatures on an integrated circuit, predicting temperatures of a location for a plurality of time instances based on the measured temperatures, and scheduling a thermal mitigation function based on the predicted temperatures.

Aspects of an apparatus are disclosed. The apparatus includes a first circuit configured to predict temperatures of a location for a plurality of time instances based on measured temperatures and a second circuit configured to schedule a thermal mitigation function based on the predicted temperatures.

Aspects of an apparatus are provided. The apparatus includes means for measuring temperatures on an integrated circuit, means for predicting temperatures of a location for a plurality of time instances based on measured temperatures, and means for scheduling a thermal mitigation function based on the predicted temperatures.

It is understood that other aspects of apparatus and methods will become readily apparent to those skilled in the art from the following detailed description, wherein various aspects of apparatus and methods are shown and described by way of illustration. As will be realized, these aspects may be implemented in other and different forms and its several details are capable of modification in various other respects. Accordingly, the drawings and detailed description are to be regarded as illustrative in nature and not as restrictive.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts. The term "exemplary" is used herein to mean "serving as an example, instance, or illustration." Any design described herein as "exemplary" is not necessarily to be construed as preferred or advantageous over other designs.

Several aspects of the disclosure will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system. Various apparatus and methods presented throughout this disclosure may be implemented in various forms of hardware. By way of example, any of these apparatus or methods, either alone or in combination, may be implemented as an integrated circuit, or as part of an integrated circuit. The integrated circuit may be an end product, such as a microprocessor, a digital signal processor (DSP), an application specific integrated circuit (ASIC), programmable logic, or any other suitable integrated circuit. Alternatively, the integrated circuit may be integrated with other chips, discrete circuit elements, and/or other components as part of either an intermediate product, such as a motherboard, or an end product.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The word "exemplary" is used herein to mean serving as an example, instance, or illustration. Any embodiment described herein as "exemplary" is not necessarily to be construed as preferred or advantageous over other embodiments. Likewise, the term "embodiment" of an apparatus or method does not require that all embodiments of the invention include the described components, structure, features, functionality, processes, advantages, benefits, or modes of operation.

The terms "connected," "coupled," or any variant thereof, mean any connection or coupling, either direct or indirect, between two or more elements, and can encompass the presence of one or more intermediate elements between two elements that are "connected" or "coupled" together. The coupling or connection between the elements can be physical, logical, or a combination thereof. As used herein, two elements can be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Any reference to an element herein using a designation such as "first," "second," and so forth does not generally limit the quantity or order of those elements. Rather, these designations are used herein as a convenient method of distinguishing between two or more elements or instances of an element. Thus, a reference to first and second elements does not mean that only two elements can be employed, or that the first element must precede the second element.

As used herein, the singular forms "a," "an" and "the" are intended to include the plural forms as well, unless the context clearly indicates otherwise. It will be further understood that the terms "comprises," "comprising," "includes" and/or "including," when used herein, specify the presence of the stated features, integers, steps, operations, elements, and/or components, but do not preclude the presence or addition of one or more other features, integers, steps, operations, elements, components, and/or groups thereof.

Various aspects of apparatus and methods for scheduling thermal mitigation functions based on predicted temperatures are presented with respect to a processor for wireless communication. However, as those skilled in the art will readily appreciate, aspects and applications of the disclosure may not be limited thereto. For example, the features presented may be applicable to other ICs and apparatuses beyond a processor. Further, the features presented may be applicable to functions beyond wireless communication as well. Accordingly, all references to a specific application for the presented apparatus or method are intended only to illustrate exemplary aspects of the apparatus or method with the understanding that such aspects may have a wide differential of applications.

Figure 1:
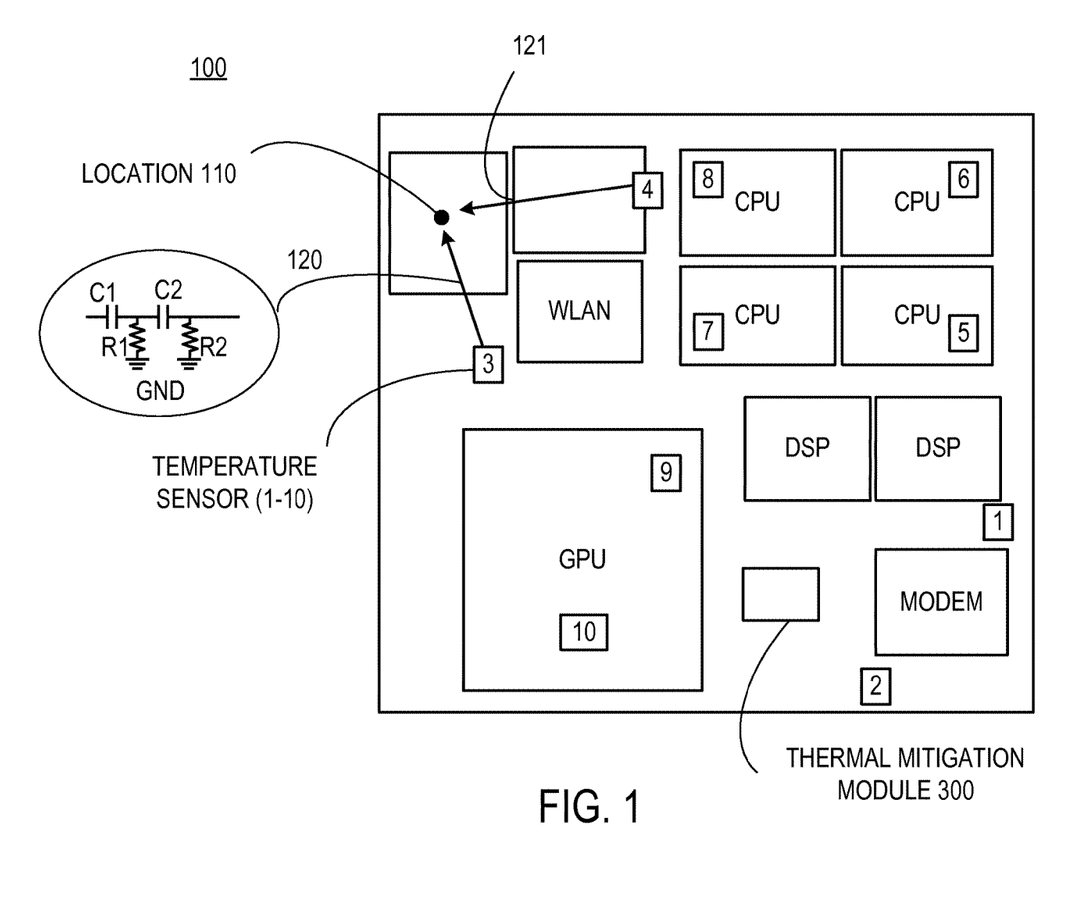
FIG. 1 is a diagram of an exemplary embodiment processor with temperature sensors.

FIG. 1 is a diagram of an exemplary embodiment processor with temperature sensors. The processor 100 may be a processor for wireless communication, such as an integrated application and baseband processor for a cell phone. The processor 100 includes various cores or blocks of circuits, such as graphic processor unit (GPU), digital signal processors (DSP), modem, central processing units (CPU), and a wireless local area network or WLAN block. A core may be, for example, a collection of circuits. The processor 100 also includes various temperature sensors (1-10). In one implementation, the temperature sensors (1-10) may measure the on-die temperatures of the processor 100 and output the measured temperatures in periodic intervals (e.g., measuring the on-die temperatures at a sampling rate).

In one configuration, the processor 100 may be configured to operate various thermal mitigation functions on the cores in order to meet certain heat limitations. The thermal mitigation functions may include reducing operating frequency of a core, lowering an operating voltage of the core, and/or power-collapsing the core.

Figure 2:
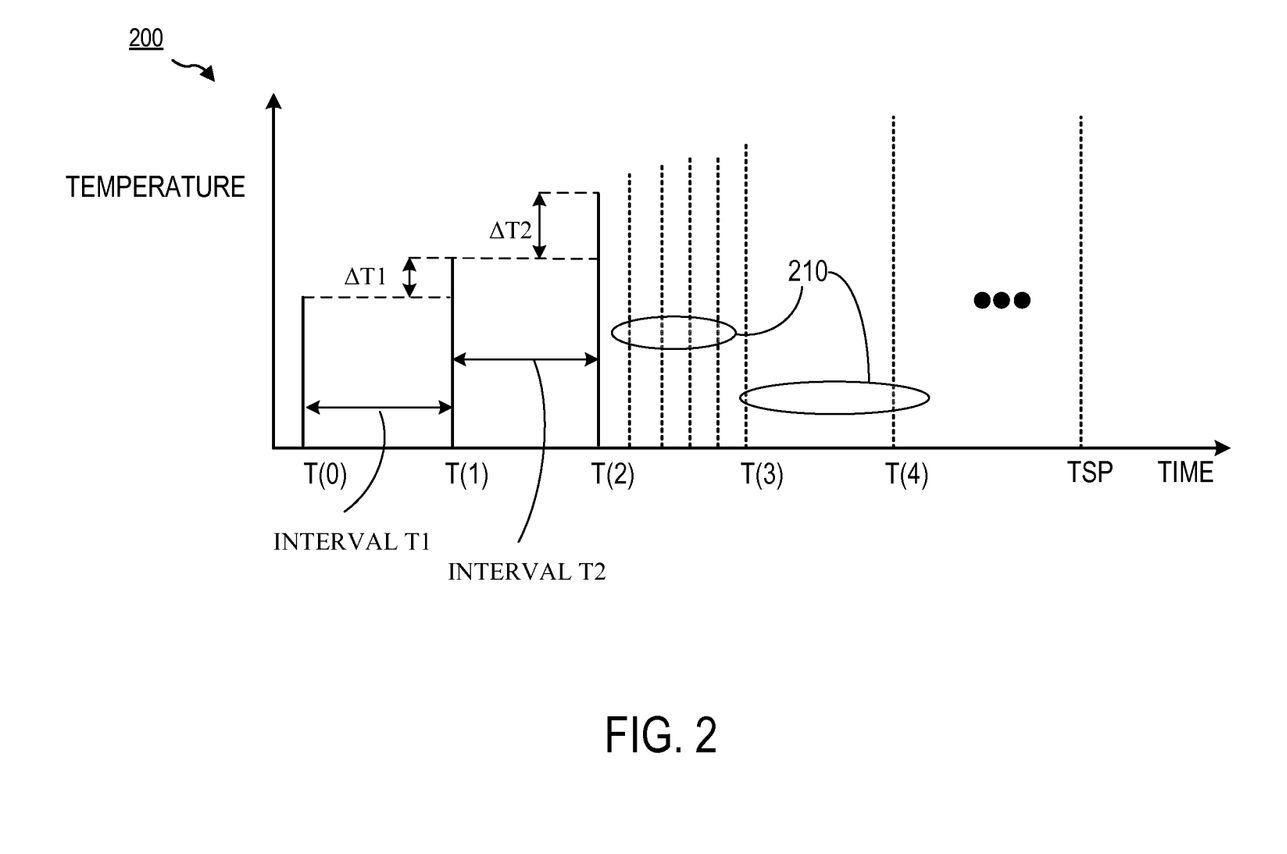
FIG. 2 is a diagram illustrating the measured temperatures at several time instances from the temperature sensors.

FIG. 2 is a diagram illustrating the measured temperatures at several time instances from the temperature sensors. The diagram 200 illustrates that the on-die temperatures are sampled or scheduled to be sampled (e.g., by the temperature sensors 1-10) at time instances $T(0)$, $T(1)$, $T(2)$, $T(3)$, $T(4)$, etc. In one example, the times instances at which the temperatures are sampled or measured may be between fixed intervals or may be interrupt driven. The sampling intervals or interrupts may be based on the measured or predicted temperatures (presented below). For example, in a case where high temperatures are measured or predicted, the sampling rate may be reduced or interrupted more frequently for measuring the temperatures.

In one implementation, the processor 100 may predict temperatures based on a history of the measured temperatures. The processor 100 may schedule the thermal mitigation functions at the predicted hot spots (e.g., locations where the predicted temperatures exceed a certain temperature threshold). In this fashion, the predicted temperatures provide the processor 100 enough time to schedule the thermal mitigation functions in advance to allow the processor 100 to operate at a high performance level (e.g., higher voltage or frequency) for a sustained period of time.

By way of example, temperatures 210 are predicted for time instances between the time instances $T(2)$ and $T(3)$ based on the history of the measured temperatures (e.g., temperatures at $T(0)$, $T(1)$, $T(2)$, etc.). In this fashion, temperatures may be predicted in finer granularity than the temperature sampling rate. In this example, at least one of the predicted temperatures 210 is between the time stances at which temperatures are scheduled to be sampled ($T(2)$, $T(3)$, etc.). In another example, before the time instance $T(3)$, the predicted temperatures 210 may include temperatures at time instances $T(3)$ and $T(4)$. The temperature sensors 1-10 poll or sample the on-die temperatures in periods of milliseconds. The sampling rate may be fixed or adaptive to the on-die temperature responses (presented below). During an interval between samplings, thousands of cycles may transpire. The predicted temperatures 210 in one such interval (e.g., between the time instances $T(2)$ and $T(3)$) allow for fine or incremental thermal mitigation measures to be scheduled and executed.

Moreover, the predicted temperatures 210 may be determined based on a rate of change of the measured temperatures and/or a rate of change of the rate of change of the measured temperatures. For example, the temperature change between $T(0)$ and $T(1)$ is $\Delta T1$, and the temperature change between $T(1)$ and $T(2)$ is $\Delta T2$. A rate of change of temperatures may be, for example, $\Delta T1$ over the interval T1 or $\Delta T2$ over the interval T2. A rate of change of the above rate of change of temperatures may be, for example, a change between $\Delta T1$ and $\Delta T2$ over a relevant time period (e.g., $T(0)$-$T(2)$).

Figure 3:
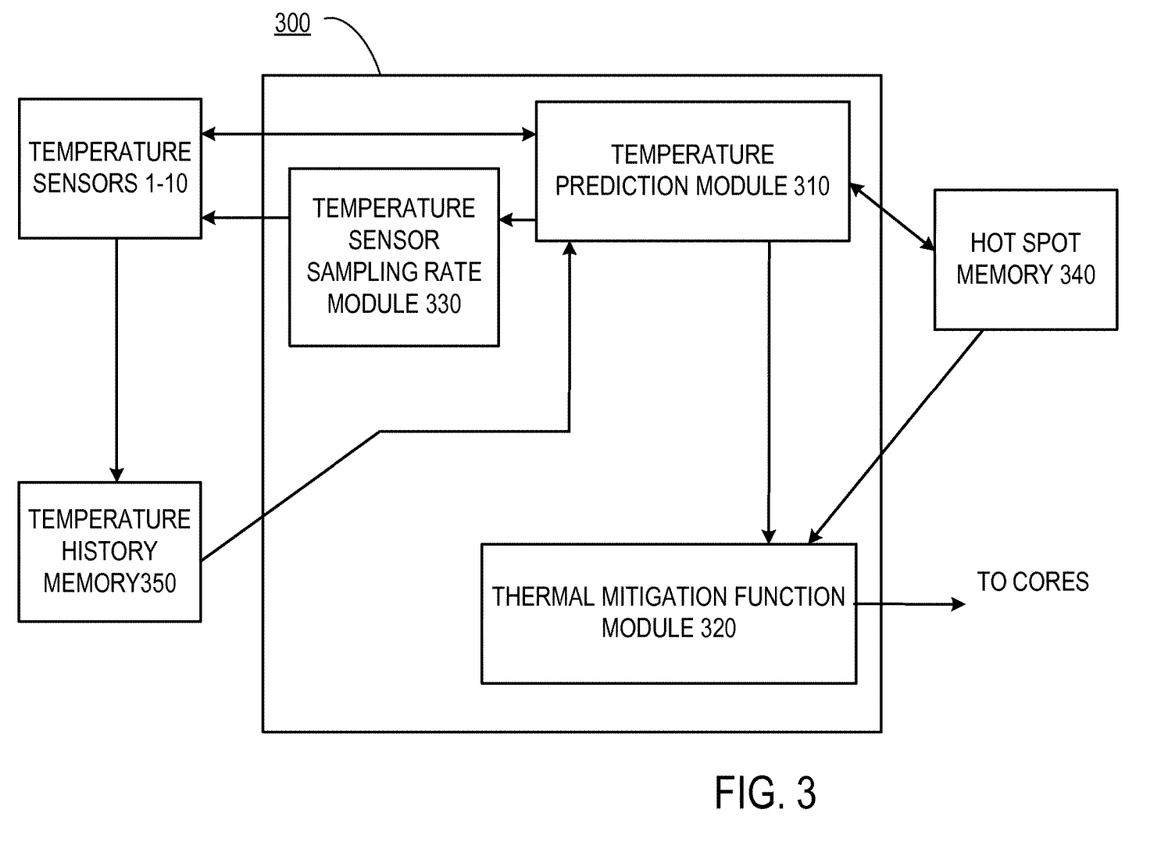
FIG. 3 is a block diagram of an exemplary embodiment of a thermal management module.

FIG. 3 is a block diagram of an exemplary embodiment of a thermal management module. The thermal management module 300 includes a temperature prediction module 310, a temperature sensor sampling rate module 330, and a thermal mitigation function module 320. These modules may include circuits, processor systems, software executing on the processor systems, or combinations thereof. These modules may include circuits for generating the signals for the functions described infra or signal lines carrying those signals. These modules may be part of processor 100 or external to the processor 100. In one example, theses modules may include instructions executed by the CPUs of the processor 100.

By way of example, a module, or any portion of a module, or any combination of modules may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

In one implementation, the temperature sensor 1-10 measures the on-die temperatures at each location, and the measured temperatures are stored in a temperature history memory 350. In one example, the temperature history memory 350 may store a rate of change of the measured temperatures (e.g., a velocity of temperature change) and/or a rate of change of the rate of change of the measured temperatures (e.g., an acceleration of temperature change). The temperature history memory 350 may be a register or any other types of storage elements. In one implementation, the temperature history may include of N time instances (e.g., measured temperatures at N time instances) where N is greater than 1. The time history of the N time instances is stored in, e.g., registers. The temperatures may be predicted (e.g., by the temperature prediction module 310) based on the stored time history of the N time instances. In one implementation, the temperatures are predicted for the locations of the temperature sensors (1-10) for multiple time instances (e.g., predicted temperatures 210).

In one implementation, the temperature prediction module 310 predicts the temperatures based on the stored information from the temperature history memory 350. In one example, the temperature prediction module 310 comprises a circuit configured to predict temperatures of a location for a plurality of time instances based on measured temperatures. In one example, temperature prediction module 310 may include a processor (e.g., one of the CPUs of FIG. 1) executing software instructions to implement the functions described below.

In one example, the temperatures may be predicted based on an extrapolation a rate of change of the measured temperatures (e.g., a velocity of temperature change) and/or a rate of change of the rate of change of the measured temperatures (e.g., an acceleration of temperature change). In another example, the temperature prediction module 310 may predict the temperatures using the as least-square methods, which minimizes the sum of the squares of the errors (e.g., differences between the predicted temperatures and the measured temperatures). In another example, the temperature prediction module 310 may predict the temperatures using the Kalman filters, which produce statistically-optimal (estimated) temperatures based on the measured temperatures. With each update of the measured temperatures, the predicted temperatures may be recalculated based on the updated measured temperatures. Further examples of these features are presented below.

In one implementation, the temperature prediction module 310 may utilize the measured or recorded temperatures to predict temperature at future time instances. For example, the derivatives of temperature changes (e.g., a rate of temperature change; a velocity of temperature change) and/or the derivatives of the derivatives of temperature changes (e.g., a rate of change of the rate of temperature change or an acceleration of temperature change) may be used to predict the temperatures in future time instances. The error terms of the predicted temperatures may be used to adjust or correct the predicted temperatures.

One implementation to adjust or correct the predicted temperatures utilizes Kalman filters, which produce statistically-optimal (estimated) temperatures based on the measured temperatures. In one example, the application of the Kalman filters includes the predicted temperature value xk and the measured temperature value Zk from the temperature sensors (1-10). The application of the Kalman-Filter method may track the rate of temperature change. When the error is less than an error threshold, the sampling rate of temperature sensors 1-10 may be reduced to save unnecessary reading of the sensors.

The following table provides an example of the application of the Kalman filters:

| Zk | xk | Pk (predicted) | Kk (predicted) | Xk (measured) | Pk (measured) |
|---|---|---|---|---|---|
| 0 | 0 | 1 | 0.952381 | 0 | 0.047619 |
| 0 | 0 | 0.047619 | 0.487805 | 0.47824 | 0.02439 |
| 0.980392 | 0.47824 | 0.02439 | 0.327869 | 0.64288 | 0.016393 |
| 0.980392 | 0.64288 | 0.016393 | 0.246914 | 0.726216 | 0.012346 |
| 0.980392 | 0.726216 | 0.012346 | 0.19802 | 0.780431 | 0.009901 |
| 1 | 0.780431 | 0.009901 | 0.165289 | 0.821585 | 0.008264 |
| 1.029412 | 0.821585 | 0.008264 | 0.141844 | 0.849673 | 0.007092 |
| 1.019608 | 0.849673 | 0.007092 | 0.124224 | 0.86104 | 0.006211 |
| 0.941176 | 0.86104 | 0.006211 | 0.110497 | 0.868812 | 0.005525 |
| 0.931373 | 0.868812 | 0.005525 | 0.099502 | 0.977466 | 0.004975 |
| 1.960784 | | | | | |

In this example, xk represents the estimated rate of change; Kk represents the Kalman gain; Zk represents the measured temperature data; and Pk represents the error covariance. For each update of the Zk (the measured temperatures), the predicted temperatures are recalculated using Pk and Kk.

The rate of temperature change (e.g., the velocity of temperature change) may be used to predict temperature at a future time instances by the following equation:

$$T_{n+x} = (\Delta T/\Delta t)_n \times \Delta t_{n+x} \quad (1)$$

Here, T represents temperature; t represents time; n represents a present or past time instance, and n+x represents a time instance in the future.

Similarly, the rate of change of the rate of temperature change (e.g., the acceleration of temperature change) may be used to predict temperature at a future time instances (if the error criteria described above is satisfied) by the following equation:

$$T_{n+x} = \frac{1}{2} \times \Delta(\Delta y/\Delta x)/\Delta x \times \Delta t_{n+x}^2 + \Delta y/\Delta x \times \Delta t_{n+x} \quad (2)$$

Here, T represents temperature; t represents time; n represents a present or past time instance, n+x represents a time instance in the future; and the term $\Delta y/\Delta x$ represents the $\Delta T/\Delta t$ (change of temperature over time) of the first equation.

In one implementation, the temperature prediction module 310 may predict temperatures at locations other than the locations of the temperature sensors 1-10. Referring to FIG. 1, the locations on the processor 100 near a temperature sensor (1-10) are limited by the number of the temperature sensors. In one implementation, the temperature prediction module 310 may predict a temperature at a location 110, which is at a distance from the location of the temperature sensor 3 (FIG. 1). For example, the temperature prediction module 310 may predict temperatures at the location 110 based on the predicted or measured temperatures at the location of the temperature sensor 3 and based on a thermal resistor-capacitor (RC) model (120). In one example, the thermal RC model 120 may be analogous to an electrical RC model and includes thermal capacitors C1 and C2 and thermal resistors R1 and R2. In one example, the thermal resistance and the thermal capacitance of the processor 100 may be intrinsic properties of the silicon, package materials, and dimensions of the IC. In one implementation, the thermal capacitors C1 and C2 and the thermal resistors R1 and R2 may be obtained from die level simulation or system measurements. Such models may be stored in a non-volatile memory (such as ROM) on the processor 100 or off-chip. In one example, the thermal RC model 120 maybe stored as part of an operation system running the processor 100. In one implementation, the temperature prediction module 310 may predict the on-die temperatures for any location on the processor 100, including the location 110, via the thermal RC model 120 and the temperature sensors 1-10.

In one example, temperature prediction module 310 may predict temperatures of the location 110 based on the predicted or measured temperatures at the location of the temperature sensor 4 via the thermal RC circuit model 121, in addition to the temperature from the temperature sensor 3. In one implementation, the thermal profile at the location 110 may be a linear superposition of the predicted or measured temperatures from the various heat sources (such as measured by the temperature sensors 3 and 4). For example, a predicted temperature at the location 110 may be a sum of a predicted or measured temperature at the location of the temperature sensor 3 (via the thermal RC model 120) and a predicted or measured temperature at the location of the temperature sensor 4 (via the thermal RC circuit model 121).

Aspects of the disclosure provide that the temperature prediction module 310 predicts the temperatures the location 110 in a forward loop (e.g., the predicted temperatures are amended in response to an updating of a measured temperature). Such predictive determination of future temperatures allows the thermal mitigation function module 320 to schedule and execute the thermal mitigation functions hundreds or even thousands clock cycles ahead. Therefore, the more measured and effective thermal mitigation functions may be performed to address the hot spots (e.g., locations where the thermal profiles are projected to exceed a temperature threshold) at a future time instance. In one implementation, fine-grain controls of temperature such as clock speed adjustment, voltage scaling, pipeline control (e.g., stall a pipeline to reduce power consumption), or power gating (e.g., shutting blocks in a core not in use to reduce power consumption) may be scheduled and executed for a hot-spot core or the neighboring cores of the hot spot to prevent mutual heating (for a hot spot of a future time instance). Such measures allow for headroom for sustained performance on a chosen core.

In one implementation, hot spot information (e.g., the predicted temperatures exceeding certain temperature limits) is stored in the hot spot memory 340. The hot spot memory 340 may include registers or other types of memories. Moreover, the hot spot information may store the predicted temperatures with location information (e.g., x and y coordinates of the processor 100). In one implementation, the temperature prediction module 310 may be configured to amend or update the predict temperatures and the hot spot information stored in the hot spot memory 340 in response to an update of the measured temperatures.

In one implementation, the thermal mitigation function module 320, based on the predicted temperatures (e.g., obtains the predicted temperatures) from the temperature prediction module 310 and/or the hot spot information from the hot spot memory 340, may schedule and execute the aforementioned thermal mitigation measures (voltage scaling, frequency adjustment, etc.) for a predicted hot spot in the future (e.g., TSP in FIG. 2). In one example, the thermal mitigation function module 320 may include a circuit configured to schedule a thermal mitigation function based on the predicted temperatures. In one example, the thermal mitigation function module 320 may executed the scheduled thermal mitigation functions at the scheduled times.

Examples for certain operations of the temperature sensor sampling rate module 330 are presented. In one implementation, the temperature sensor sampling rate module 330 may be configured to control the sampling rate of the temperature sensors 1-10. In on implementation, the temperature sensors sampling rate may be based on a predicted temperature. The temperature sensors sampling rate may be further based on an error tolerance (e.g., a threshold of a difference between a measured temperature and a predicted temperature).

In one example, referring to FIG. 2, the temperatures at time instances $T(0)$, $T(1)$, and $T(2)$ are measured by the temperature sensors 1-10, and the future temperatures at time instances $T(3)$ and $T(4)$ are predicted by the temperature prediction module 310 as described above (e.g., based on a rate of temperature change or a rate of change of the rate of temperature change). A mitigation temperature set point TSP may be set at some point in a future time. The TSP may be a predicted hot spot (e.g. a predicted temperature at the TSP exceeds a temperature threshold).

In one implementation, the steps described below may be performed for each of the temperature sensors 1-10. The predicted temperatures are compared (e.g., by the temperature prediction module 310) with the measured temperatures when the temperature sensors 1-10 sample the on-die temperatures. For example, at time instance $T(3)$, a measured or sampled temperature from, e.g., the temperature sensors 1 is compared with the corresponding predicted temperature 210 at the time instance $T(3)$. If a difference is less than an error tolerance ERR1, then the temperature sensor sampling rate module 330 may cause the temperature sensors 1 to pass on the next M samplings (e.g., from the time instance $T(3)$). The error tolerance ERR1 may be programmable by users and, in one example, the default may be 2° C.

In one implementation, the value M for passing the scheduled samplings may be programmable and may be defaulted to two. The temperature sensor sampling rate module 330 may include registers for storing M and may adjust the value of M based on the error tolerance ERR1 described above. The temperature sensor sampling rate module 330 may further control the clocking of the temperature sensors 1-10 (e.g., the sampling rate) to pass on the scheduled sampling the temperature based on the value M. In one example, in a case that the difference between the measured temperature and the predicted temperature is within a second error tolerance (e.g., within 1° C.), the temperature sensor sampling rate module 330 may further increase M and thereby further reducing the sampling rate of a temperature sensor (1-10).

In another implementation, the temperature prediction module 310 may be configured to further change the sampling rate of the temperature sensors 1-10 based on a time to the TSP. In one example, in a case that the time to TSP in two consecutive adjustments is greater than ERR2 (a time variable programmable by users, and may default to 1.5 ms), then the value of M may be further decreased (e.g., more scheduled samplings would be passed). For example, if ERR2 is 5 ms, then M may be set to 1, which means that the next sampling of the temperature sensors (1-10) will be used to calibrate the time to TSP.

As described above, the sampling rate of the temperature sensors (1-10) may be adjustable and therefore, energy consumption may be realized. Moreover, in the described fashion, the temperature sensors (1-10) may be configured to measure temperatures at a sampling rate based on one of the predicted temperatures. The adjusted sampling rate may be further based on an error tolerance (e.g., ERR1).

In one implementation, the temperature sensors (1-10) provide examples of means for measuring temperatures on an integrated circuit (e.g., the processor 100). The temperature prediction module 310 provides an example of means for predicting temperatures of a location (e.g., location 110) for a plurality of time instances based on measured temperatures (e.g., measured temperature data stored in the temperature history memory 350). The thermal mitigation function module 320 provides an example of means for scheduling a thermal mitigation function based on the predicted temperatures (e.g., the predicted temperatures 210).

Figure 4:
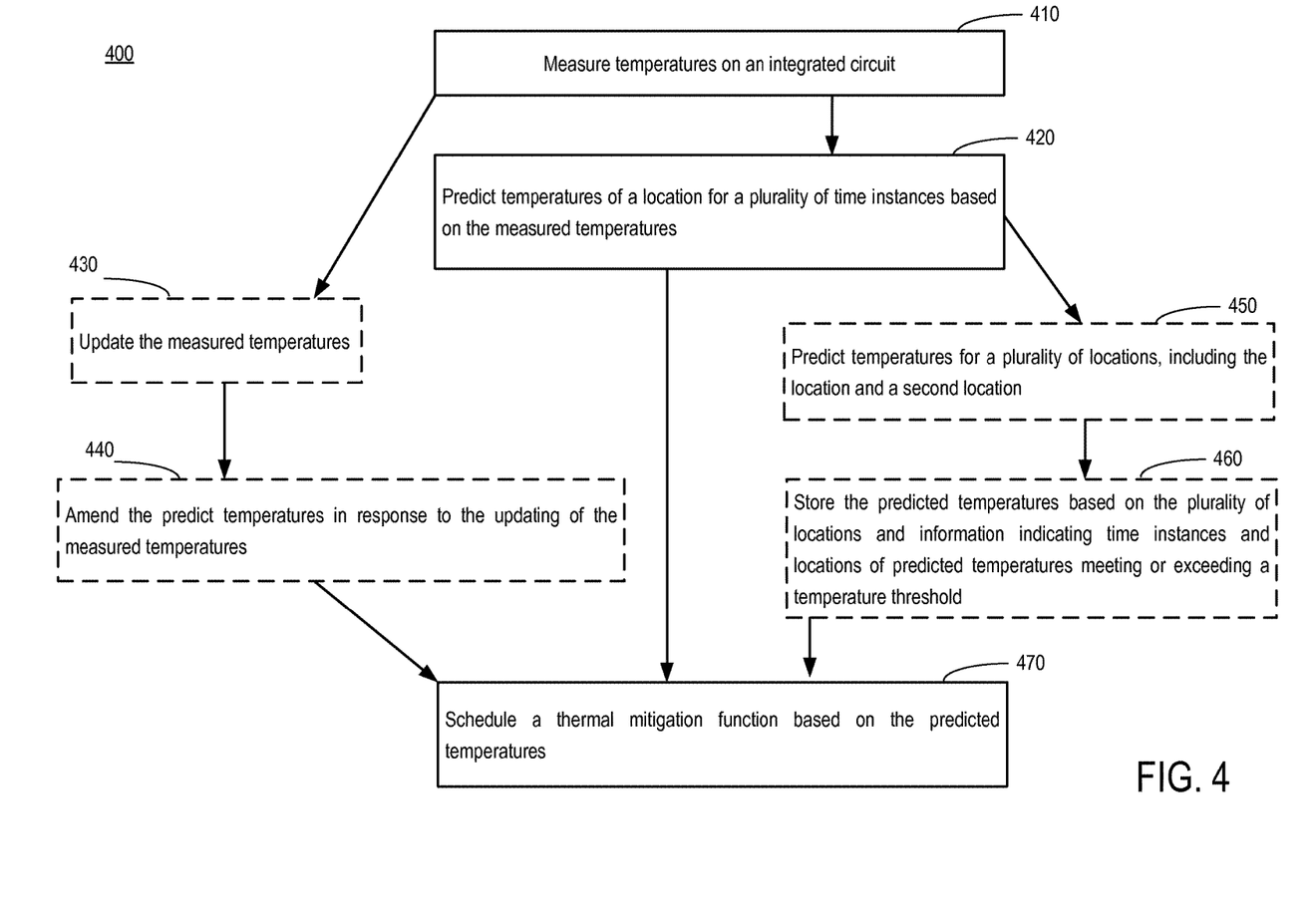
FIG. 4 is a diagram of a flow chart of an exemplary embodiment for operating an exemplary embodiment of a thermal management module.

FIG. 4 is a diagram of a flow chart of an exemplary embodiment for operating an exemplary embodiment of thermal management module. The steps boxed in dotted line may be optional. Examples of the samples are presented with FIGS. 1-3. At 410, temperatures on an integrated circuit are measured. For example, the temperature sensors 1-10 measure the on-die temperatures of the processor 100 at a sampling rate. The measured temperature data may be stored in the temperature history memory 350. At 420, the temperatures of a location are predicted for a plurality of time instances based on the measured temperatures. For example, the temperature prediction module 310 may predict the temperatures at location 110 based on the measured temperatures stored in the temperature history memory 350. The temperatures may be predicted based on a rate of the temperature change or a rate of the rate of temperature change.

At 430, the measured temperatures are updated. For example, the temperature sensors 1-10 may measure or update the on-die temperatures at the sampling rate. At 440, the predict temperatures are amended in response to the updating of the measured temperatures. For example, as presented above, the temperature prediction module 310 may amend the predicted temperatures after each update of the measured temperature (e.g., via application of the Kalman filters.)

At 450, temperatures for a plurality of locations, including the location and a second location, are predicted. For example, the temperature prediction module 310 may predict temperatures for any location, including the location 110, on the processor 100 via the thermal RC model 120. At 460, the predicted temperatures based on the plurality of locations and information indicating time instances and locations of predicted temperatures meeting or exceeding a temperature threshold are stored. For example, the hot spot memory 340 may store the store the predicted temperatures based on the plurality of locations (e.g., x and y location information). The hot spot memory 340 may further store information indicating time instances and locations of predicted temperatures meeting or exceeding a temperature threshold (e.g., the hot spots).

At 470, a thermal mitigation function is scheduled based on the predicted temperatures. For example, the thermal mitigation function module 320 may schedule (and execute) the thermal mitigation functions based on the hot spot information stored in the hot spot memory 340 to mitigate the hot spots (e.g., locations where the thermal profiles are projected to exceed a temperature threshold) at a future time instance. In one implementation, fine-grain controls of temperature such as clock speed adjustment, voltage scaling, pipeline control (e.g., stall a pipeline to reduce power consumption), or power gating (e.g., shutting blocks in a core not in use to reduce power consumption) may be scheduled and executed for a hot-spot core or the neighboring cores of the hot spot to prevent mutual heating (for a hot spot of a future time instance). Such measures allow for headroom for sustained performance on a chosen core.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), unless the element is expressly recited using the phrase "means for" or, in the case of a method claim, the element is recited using the phrase "step for."

What is claimed is:

1. An apparatus, comprising:
    a first circuit configured to predict temperatures of a location for a plurality of time instances based on a change in measured temperatures; and
    a second circuit configured to schedule, at a first time, a thermal mitigation function for execution at a second time later than the first time, based on the predicted temperatures.

2. The apparatus of claim 1, wherein the first circuit is configured to predict the temperatures based on a rate of change of the measured temperatures.

3. The apparatus of claim 1, wherein the first circuit is configured to predict the temperatures based on a rate of change of a rate of change of the measured temperatures.

4. The apparatus of claim 1, wherein at least one of the plurality of time instances of the predicted temperatures is between time instances at which temperatures are scheduled to be sampled.

5. The apparatus of claim 1, wherein the first circuit is configured to amend the predicted temperatures in response to an updating of the measured temperatures.

6. The apparatus of claim 1, wherein the first circuit is configured to predict temperatures for a plurality of locations, including the location and a second location.

7. The apparatus of claim 6, further comprising a memory configured to store the predicted temperatures based on the plurality of locations, including information indicating time instances and locations of predicted temperatures meeting or exceeding a temperature threshold.

8. The apparatus of claim 7, wherein the second circuit is configured to schedule the thermal mitigation function based on the information indicating the time instances and the locations of the predicted temperatures meeting or exceeding the temperature threshold.

9. The apparatus of claim 1, wherein the first circuit is configured to predict temperatures at a second location based on at least one predicted temperature of the location.

10. The apparatus of claim 9, wherein the first circuit is configured to predict temperatures at the second location based on a sum of the at least one predicted temperature of the location and a predicted or measured temperature of a third location.

11. The apparatus of claim 1, wherein:
the apparatus comprises temperature sensors configured to provide the measured temperatures; and
at least one of the plurality of temperature sensors is configured to change a sampling rate for measuring temperatures based on one of the predicted temperatures.

12. The apparatus of claim 11, wherein at least one of the plurality of temperature sensors is configured to change the sampling rate further based on an error tolerance.

13. A method of operating an apparatus, comprising:
measuring temperatures on an integrated circuit;
predicting temperatures of a location for a plurality of time instances based on a change in the measured temperatures; and
scheduling, at a first time, a thermal mitigation function for execution at a second time later than the first time, based on the predicted temperatures.

14. The method of claim 13, wherein the temperatures are predicted based on a rate of change of the measured temperatures.

15. The method of claim 13, wherein the temperatures are predicted based on a rate of change of a rate of change of the measured temperatures.

16. The method of claim 13, wherein at least one of the plurality of time instances of the predicted temperatures is between time instances at which temperatures are scheduled to be sampled.

17. The method of claim 13, further comprising:
updating the measured temperatures; and
amending the predicted temperatures in response to the updating of the measured temperatures.

18. The method of claim 13, further comprising predicting temperatures for a plurality of locations, including the location and a second location.

19. The method of claim 18, further comprising storing the predicted temperatures based on the plurality of locations and information indicating time instances and locations of predicted temperatures meeting or exceeding a temperature threshold.

20. The method of claim 19, wherein the thermal mitigation function is scheduled based on the information indicating the time instances and the locations of the predicted temperatures meeting or exceeding the temperature threshold.

21. The method of claim 13, further comprising predicting a temperature at a second location based on at least one predicted temperature of the location.

22. The method of claim 21, further comprising predicting or measuring a temperature at a third location, wherein the predicting the temperature at the second location comprises summing the at least one predicted temperature of the location and the predicted or measured temperature at the third location.

23. The method of claim 13, further comprising changing a sampling rate at which the temperatures are measured based on one of the predicted temperatures.

24. The method of claim 23, wherein changing the sampling rate is further based on an error tolerance.

25. An apparatus, comprising:
means for measuring temperatures on an integrated circuit;
means for predicting temperatures of a location using a plurality of temperature sensors, the location remote from the plurality of temperature sensors, for a plurality of time instances based on a change in measured temperatures; and
means for scheduling, at a first time, a thermal mitigation function, for execution at a second time later than the first time, based on the predicted temperatures.

26. The apparatus of claim 25, wherein the means for predicting temperatures of the location is configured to predict the temperatures based on a rate of change of the measured temperatures.

27. The apparatus of claim 25, wherein the means for predicting temperatures of the location is configured to predict the temperatures based on a rate of change of a rate of change of the measured temperatures.

28. The apparatus of claim 25, wherein the means for measuring temperatures is configured to change a sampling rate at which the temperatures are measured based on one of the predicted temperatures.

29. The apparatus of claim 25, wherein:
the apparatus comprises means for generating a clock signal having a clock cycle; and
the second time is at least two-hundred clock cycles after the first time.

30. The apparatus of claim 1, wherein the second circuit is further configured to execute the thermal mitigation function at the second time.

* * * * *